US007987704B2

(12) United States Patent
Lucido et al.

(10) Patent No.: US 7,987,704 B2
(45) Date of Patent: Aug. 2, 2011

(54) FUEL SYSTEM DIAGNOSTIC SYSTEMS AND METHODS

(75) Inventors: Michael J. Lucido, Northville, MI (US); Wenbo Wang, Novi, MI (US); Ian J. MacEwen, White Lake, MI (US); Jon C. Miller, Fenton, MI (US)

(73) Assignee: GM Global Technology Operations LLC

( * ) Notice: Subject to any disclaimer, the term of this patent is extended or adjusted under 35 U.S.C. 154(b) by 161 days.

(21) Appl. No.: 12/469,949

(22) Filed: May 21, 2009

(65) Prior Publication Data

US 2010/0294030 A1 Nov. 25, 2010

(51) Int. Cl.
*G01M 15/04* (2006.01)

(52) U.S. Cl. .................................................... 73/114.43

(58) Field of Classification Search ............... 73/114.41, 73/114.43
See application file for complete search history.

(56) References Cited

U.S. PATENT DOCUMENTS

| | | | | |
|---|---|---|---|---|
| 5,241,933 | A * | 9/1993 | Morikawa | 123/198 D |
| 5,983,714 | A * | 11/1999 | Izumiura et al. | 73/114.43 |
| 6,032,639 | A * | 3/2000 | Goto et al. | 123/295 |
| 6,283,108 | B1 * | 9/2001 | Matsufuji et al. | 123/690 |
| 6,502,551 | B2 * | 1/2003 | Antonioli et al. | 123/456 |
| 6,907,775 | B2 * | 6/2005 | Hosoya | 73/114.41 |
| 7,137,294 | B2 * | 11/2006 | Eser et al. | 73/114.51 |
| 7,472,690 | B2 * | 1/2009 | Takayanagi et al. | 123/446 |
| 7,706,962 | B2 * | 4/2010 | Fushiki et al. | 701/114 |
| 2006/0144130 | A1 * | 7/2006 | Eser et al. | 73/118.1 |
| 2007/0246021 | A1 * | 10/2007 | Takayanagi et al. | 123/497 |
| 2007/0251502 | A1 * | 11/2007 | Takayanagi et al. | 123/458 |
| 2010/0147058 | A1 * | 6/2010 | Cinpinski et al. | 73/114.51 |
| 2010/0275679 | A1 * | 11/2010 | Wang et al. | 73/114.42 |
| 2010/0280741 | A1 * | 11/2010 | Wang et al. | 701/103 |
| 2010/0280742 | A1 * | 11/2010 | Gwidt et al. | 701/103 |

* cited by examiner

*Primary Examiner* — Freddie Kirkland, III

(57) ABSTRACT

A diagnostic system comprises a monitoring module and a diagnostic module. The monitoring module receives a first rail pressure measured by a high side rail pressure sensor during engine cranking at a location where fuel is pressurized by a high pressure fuel pump. The diagnostic module selectively diagnoses a fault in at least one of the high pressure fuel pump and the high side rail pressure sensor when the first rail pressure is less than a predetermined pressure and rail pressures received during a predetermined period after the first rail pressure is received are less than the predetermined pressure.

30 Claims, 5 Drawing Sheets

FUEL SYSTEM DIAGNOSTIC SYSTEMS AND METHODS

The present disclosure relates to internal combustion engines and more particularly to high pressure fuel systems for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine of a vehicle combusts a mixture of air and fuel to produce drive torque. The air is drawn into the engine through a throttle valve and an intake manifold. Fuel is mixed with the air to form an air/fuel mixture. The air/fuel mixture is combusted within one or more cylinders of the engine.

The fuel that is mixed with air for combustion is stored in a fuel tank. A low pressure pump draws fuel from the fuel tank. The low pressure pump pressurizes the fuel and supplies low pressure fuel to a high pressure pump. The high pressure pump further pressurizes the fuel and supplies the pressurized fuel to one or more fuel injectors.

An engine control module (ECM) controls the amount and timing of fuel injection, torque output by the engine, and various other parameters of the engine system. The ECM may also diagnose faults in one or more components of the vehicle. These faults may be used to, for example, notify a driver to seek vehicle service and aid a service technician in servicing the vehicle.

SUMMARY

A diagnostic system comprises a monitoring module and a diagnostic module. The monitoring module receives a first rail pressure measured by a high side rail pressure sensor during engine cranking at a location where fuel is pressurized by a high pressure fuel pump. The diagnostic module selectively diagnoses a fault in at least one of the high pressure fuel pump and the high side rail pressure sensor when the first rail pressure is less than a predetermined pressure and rail pressures received during a predetermined period after the first rail pressure is received are less than the predetermined pressure.

In other features, the diagnostic module diagnoses the fault when each of the rail pressures received during the predetermined period are less than the predetermined pressure.

In still other features, the diagnostic module diagnoses the fault when the first rail pressure is greater than the predetermined pressure and a second rail pressure is less than a second predetermined pressure. The second rail pressure is received after the first rail pressure, and the second predetermined pressure is less than the predetermined pressure.

In further features, the diagnostic module diagnoses the fault when the first rail pressure is greater than the predetermined pressure and a predetermined number of rail pressures received after the first rail pressure are less than a second predetermined pressure. The second predetermined pressure is less than the predetermined pressure.

In still further features, the diagnostic system further comprises a disabling module. The disabling module disables the diagnostic module when an engine speed is less than a predetermined speed.

In other features, the diagnostic system further comprises a disabling module. The disabling module disables the diagnostic module when a fuel level is less than a predetermined level.

In still other features, the diagnostic system further comprises a disabling module. The disabling module disables the diagnostic module when a fault has been diagnosed in at least one of a low pressure fuel pump and a low side rail pressure sensor that measures fuel pressure between the high and low pressure fuel pumps.

In further features, the diagnostic system further comprises a fault control module. The fault control module extends a period for the engine cranking when the fault is diagnosed.

A diagnostic system comprises a monitoring module and a diagnostic module. The monitoring module receives first and second rail pressures measured by a high side rail pressure sensor during engine cranking at a location where fuel is pressurized by a high pressure fuel pump. The second rail pressure is received after the first rail pressure. The diagnostic module selectively diagnoses a fault in at least one of the high pressure fuel pump and the high side rail pressure sensor when the first rail pressure is greater than a first predetermined pressure and the second rail pressure is less than a second predetermined pressure. The, second predetermined pressure is less than the first predetermined pressure.

In other features, the diagnostic module diagnoses the fault when a predetermined number of rail pressures received after the first rail pressure are less than the second predetermined rail pressure.

In still other features, the diagnostic module diagnoses the fault when the first rail pressure is less than the first predetermined pressure and each rail pressure received during a predetermined period after the first rail pressure is received is less than the first predetermined pressure.

In further features, the diagnostic system further comprises a disabling module. The disabling module disables the diagnostic module when an engine speed is less than a predetermined speed.

In still further features, the diagnostic system further comprises a disabling module. The disabling module disables the diagnostic module when a fuel level is less than a predetermined level.

In other features, the diagnostic system further comprises a disabling module. The disabling module disables the diagnostic module when a fault has been diagnosed in at least one of a low pressure fuel pump and a low side rail pressure sensor that measures fuel pressure between the high and low pressure fuel pumps.

In still other features, the diagnostic system further comprises a fault control module. The fault control module extends a period for the engine cranking when the fault is diagnosed.

A diagnostic method comprises: receiving a first rail pressure measured by a high side rail pressure sensor during engine cranking at a location where fuel is pressurized by a high pressure fuel pump; and selectively diagnosing a fault in at least one of the high pressure fuel pump and the high side rail pressure sensor when the first rail pressure is less than a predetermined pressure and rail pressures received during a predetermined period after the first rail pressure is received are less than the predetermined pressure.

In other features, the diagnostic method further comprises diagnosing the fault when each of the rail pressures received during the predetermined period are less than the predetermined pressure.

In still other features, the diagnostic method further comprises diagnosing the fault when the first rail pressure is greater than the predetermined pressure and a second rail pressure is less than a second predetermined pressure. The second rail pressure is received after the first rail pressure, and the second predetermined pressure is less than the predetermined pressure.

In further features, the diagnostic method further comprises diagnosing the fault when the first rail pressure is greater than the predetermined pressure and a predetermined number of rail pressures received after the first rail pressure are less than a second predetermined pressure. The second predetermined pressure is less than the predetermined pressure.

In still further features, the diagnostic method further comprises disabling the selectively diagnosing when an engine speed is less than a predetermined speed.

In other features, the diagnostic method further comprises disabling the selectively diagnosing when a fuel level is less than a predetermined level.

In still other features, the diagnostic method further comprises disabling the selectively diagnosing when a fault has been diagnosed in at least one of a low pressure fuel pump and a low side rail pressure sensor that measures fuel pressure between the high and low pressure fuel pumps.

In further features, the diagnostic method further comprises extending a period for the engine cranking when the fault is diagnosed.

A diagnostic method comprises: receiving a first and second rail pressures measured by a high side rail pressure sensor during engine cranking at a location where fuel is pressurized by a high pressure fuel pump; and selectively diagnosing a fault in at least one of the high pressure fuel pump and the high side rail pressure sensor when the first rail pressure is greater than a first predetermined pressure and the second rail pressure is less than a second predetermined pressure. The second rail pressure is received after the first rail pressure, and the second predetermined pressure is less than the first predetermined pressure.

In other features, the diagnostic method further comprises diagnosing the fault when a predetermined number of rail pressures received after the first rail pressure are less than the second predetermined rail pressure.

In still other features, the diagnostic method further comprises diagnosing the fault when the first rail pressure is less than the first predetermined pressure and each rail pressure received during a predetermined period after the first rail pressure is received is less than the first predetermined pressure.

In further features, the diagnostic method further comprises disabling the selectively diagnosing when an engine speed is less than a predetermined speed.

In still further features, the diagnostic method further comprises disabling the selectively diagnosing when a fuel level is less than a predetermined level.

In other features, the diagnostic method further comprises disabling the selectively diagnosing when a fault has been diagnosed in at least one of a low pressure fuel pump and a low side rail pressure sensor that measures fuel pressure between the high and low pressure fuel pumps.

In still other features, the diagnostic method further comprises extending a period for the engine cranking when the fault is diagnosed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
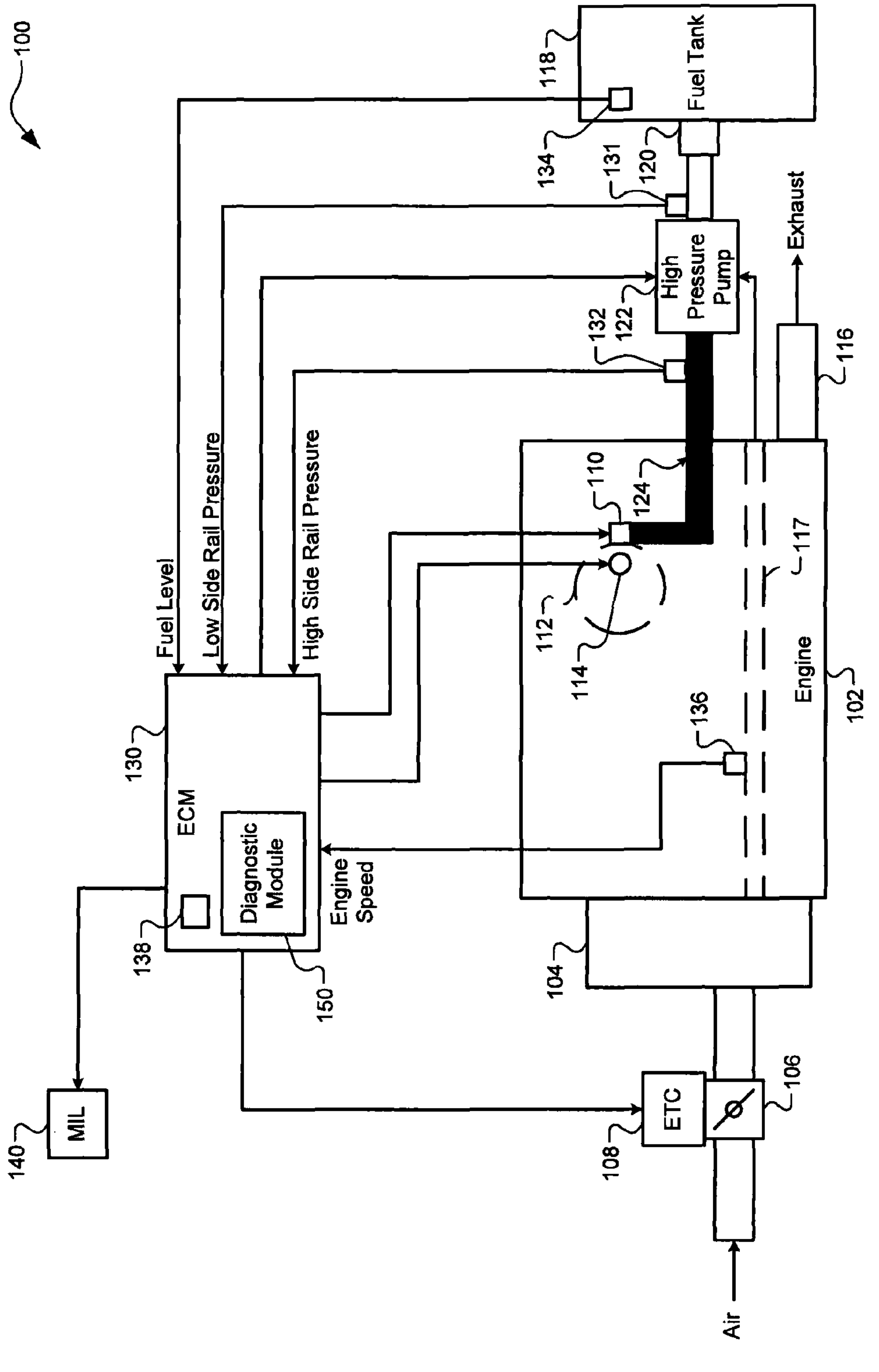
FIG. 1 is a functional block diagram of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A fuel system supplies fuel to an engine for combustion. Among other components, the fuel system includes a low pressure fuel pump and a high pressure fuel pump. The low pressure fuel pump supplies fuel at low pressures to the high pressure pump. The high pressure fuel pump is driven by a crankshaft of the engine and further pressurizes the fuel within a fuel rail. A high side rail pressure sensor measures the pressure of the fuel pressurized by the high pressure fuel pump (i.e., high side rail pressure).

As the high pressure fuel pump is driven by the crankshaft, the high side rail pressure is generally lower than desired upon engine startup. An engine cranking procedure is initiated for engine startup that causes rotation of the crankshaft, thereby driving the high pressure fuel pump. An engine control module activates the high pressure fuel pump during engine cranking to increase the high side rail pressure to a first predetermined pressure suitable for fuel injection.

A diagnostic system selectively diagnoses a fault in the high side rail pressure sensor and the high pressure fuel pump based on the high side rail pressure during engine cranking. An initial high side rail pressure is measured a predetermined period after engine cranking begins. If the initial high side rail pressure is less than the first predetermined pressure, the diagnostic system diagnoses the fault when the high side rail pressure remains below the first predetermined pressure for a predetermined period. When the initial high side rail pressure is greater than the first predetermined pressure, however, the diagnostic system selectively diagnoses the fault when the high side rail pressure becomes less than a second predetermined pressure.

Referring now to FIG. 1, a functional block diagram of an engine system 100 is presented. Air is drawn into an engine 102 through an intake manifold 104. A throttle valve 106 is actuated by an electronic throttle controller (ETC) 108 to vary the volume of air drawn into the engine 102. The air mixes with fuel from one or more fuel injectors 110 to form an air/fuel mixture. The air/fuel mixture is combusted within one or more cylinders of the engine 102, such as cylinder 112.

The engine 102 may be a spark ignition type engine, a compression ignition type engine, or another suitable type of engine. A spark plug 114 initiates combustion of the air/fuel mixture in some types of engine systems, while the spark plug 114 may be unnecessary in other types of engine systems. Although one fuel injector, spark plug, and cylinder are shown, the engine 102 may include more or fewer fuel injectors, spark plugs, and/or cylinders. Exhaust gas resulting from combustion is expelled from the engine 102 to an exhaust system 116. Torque generated by combustion of the air/fuel mixture is output from the engine 102 via a crankshaft 117.

Fuel for combustion is stored in a fuel tank 118. A low pressure pump 120 draws fuel from the fuel tank 118 and supplies fuel to a high pressure pump 122. The high pressure pump 122 provides pressurized fuel to the fuel injectors via a fuel rail 124. The high pressure pump 122 is driven by the crankshaft 117.

The fuel injector 110 injects fuel based on commands from an engine control module (ECM) 130. The ECM 130 controls timing of fuel injection and the amount of fuel injected by the fuel injector 110. The ECM 130 also controls airflow into the engine, spark timing, and other engine parameters.

The ECM 130 receives signals from various sensors, such as a low side rail pressure sensor 131, a high side rail pressure sensor 132, a fuel level sensor 134, and an engine speed sensor 136. The low side rail pressure sensor 131 measures the pressure of the fuel supplied to the high pressure pump 122 (i.e., between the low and high pressure pumps 120 and 122). The high side rail pressure sensor 132 measures the pressure of the fuel within the fuel rail 124 and outputs a high side rail pressure signal accordingly.

The fuel level sensor 134 measures the amount of fuel stored in the fuel tank 118 (e.g., volume or level). The engine speed sensor 136 measures engine speed based on rotation of the crankshaft 117. The fuel level sensor 134 and the engine speed sensor 136 output fuel level and engine speed signals, respectively.

The ECM 130 controls operation (i.e., activation/deactivation) of the high pressure pump 122 to regulate the high side rail pressure during engine operation. For example only, the ECM 130 may maintain the high side rail pressure at predetermined pressure during engine operation, such as approximately 10.0 MPa. After engine shutdown (e.g., key off), the high side rail pressure decays toward atmospheric (i.e., barometric) pressure. This decay may be attributable to disabling of the high pressure pump 122, slowing of the crankshaft 117, and/or fuel leak-back toward the fuel tank 118.

Upon engine startup (e.g., key on), the high side rail pressure may be near the atmospheric pressure. When the engine 102 has been shutdown for a short period of time, the high side rail pressure may be near the predetermined operating pressure. Engine cranking is initiated for engine startup, which causes rotation of the crankshaft 117. The ECM 130 activates the high pressure pump 122 to pressurize fuel within the fuel rail 124. The ECM 130 selectively initiates fuel injection during engine cranking after the high side rail pressure reaches a first predetermined pressure.

The ECM 130 diagnoses faults in various components of the engine system 100 based on parameters measured by various sensors. The ECM 130 sets a fault indicator (e.g., a diagnostic trouble code) in diagnostic memory 138 when a fault is diagnosed. The fault indicator may aid a vehicle servicer in identifying and/or remedying a diagnosed fault. The ECM 130 may also illuminate an indicator when a fault is diagnosed, such as a malfunction indicator lamp (MIL) 140.

The ECM 130 includes a diagnostic module 150 that selectively diagnoses a fault in the high pressure side of the fuel system. More specifically, the diagnostic module 150 selectively diagnoses a fault in the high pressure pump 122 and/or the high side rail pressure sensor 132. The diagnostic module 150 diagnoses the fault based on the high side rail pressure measured after engine cranking has begun.

When an initial high side rail pressure is less than the first predetermined pressure after engine cranking has begun, the diagnostic module 150 diagnoses the fault when the high side rail pressure remains below the first predetermined pressure for a predetermined period of time. When the initial high side rail pressure is greater than the first predetermined pressure, the diagnostic module 150 diagnoses the fault when a predetermined number of high side rail pressure samples are less than a second predetermined pressure. The initial high side rail pressure refers to the high side rail pressure measured a predetermined period after engine cranking begins.

Figure 2:
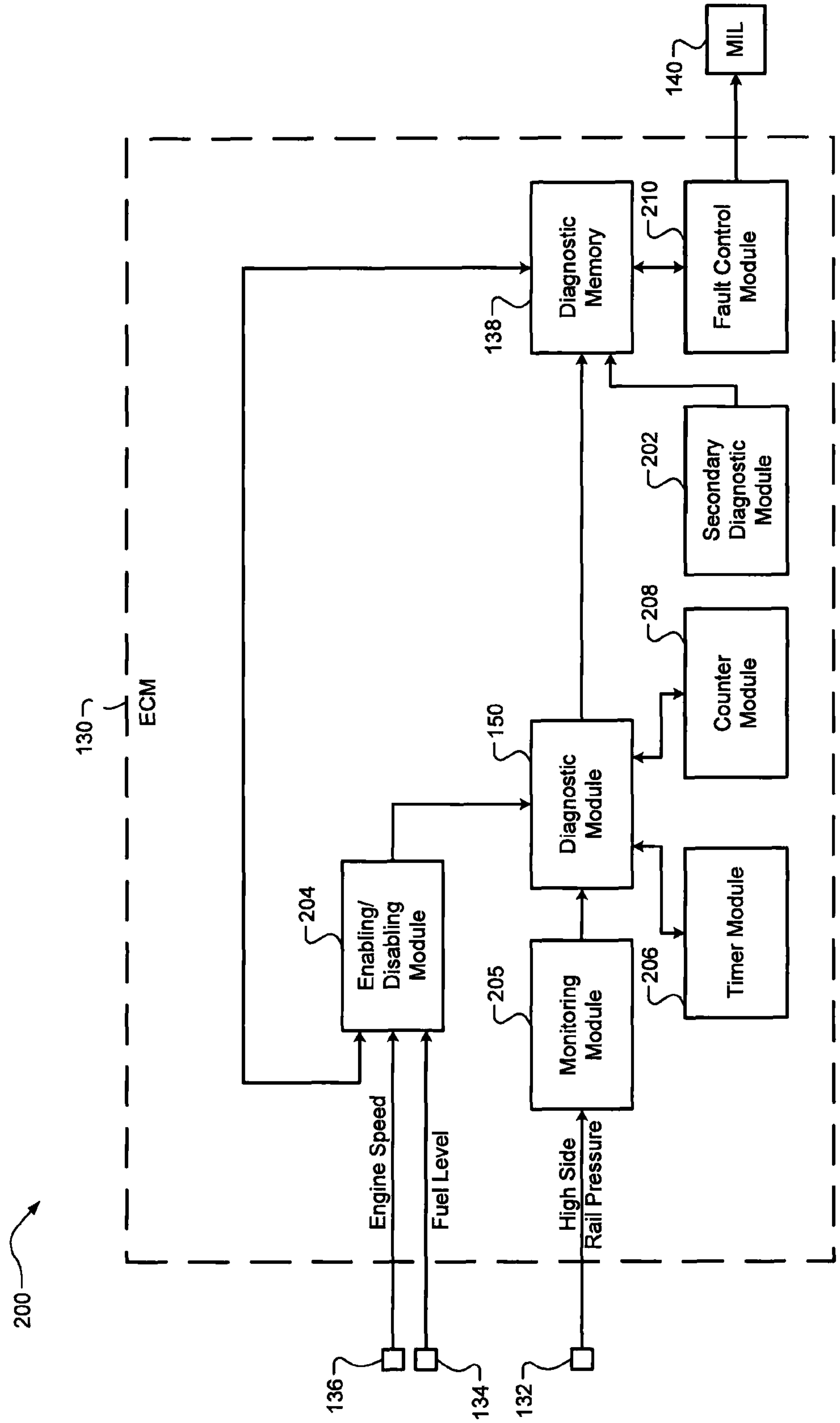
FIG. 2 is a functional block diagram of an exemplary diagnostic system according to the principles of the present disclosure.

Referring now to FIG. 2, a functional block diagram of an exemplary diagnostic system 200 is presented. The ECM 130 includes the diagnostic memory 138 and the diagnostic module 150. The ECM 130 also includes a secondary diagnostic module 202, an enabling/disabling module 204, a monitoring module 205, a timer module 206, a counter module 208, and a fault control module 210. While the diagnostic module 150 and other modules of FIG. 2 are shown and described as being located within the ECM 130, the diagnostic module 150 and/or other modules may be located in another suitable location, such as external to the ECM 130.

The secondary diagnostic module 202 selectively diagnoses faults in components of the fuel system other than the high pressure pump 122 and the high side rail pressure sensor 132. More specifically, the secondary diagnostic module 202 diagnoses faults in the low pressure pump 120 and/or the low side rail pressure sensor 131. The secondary diagnostic module 202 sets a specified fault indicator (e.g., a diagnostic trouble code) in the diagnostic memory 138 when a fault is diagnosed in the low pressure pump 120 and/or the low side rail pressure sensor 131.

The enabling/disabling module 204 selectively enables and disables the diagnostic module 150 based on whether predetermined enabling conditions are satisfied. The enabling/disabling module 204 enables the diagnostic module 150 when the enabling conditions are satisfied. The enabling/disabling module 204 disables the diagnostic module 150 when the enabling conditions are not satisfied.

Parameters for determining whether the enabling conditions are satisfied may include, for example, the engine speed, the fuel level, system voltage, and whether a fault has been diagnosed in the low pressure pump 120 and/or the low side rail pressure sensor 131. For example only, the enabling/disabling module 204 may enable the diagnostic module 150 when: (1) the engine speed is greater than a predetermined speed; (2) the fuel level is greater than a predetermined level; (3) the system voltage is within a predetermined voltage range; and (4) no fault has been diagnosed in either the low pressure pump 120 or the low side rail pressure sensor 131.

In other words, the enabling/disabling module 204 disables the diagnostic module 150 when the engine speed is less than the predetermined speed. The predetermined speed may be calibratable and may be set to, for example, approximately 400 revolutions per minute (rpm). The enabling/disabling module 204 also disables the diagnostic module 150 when the fuel level is less than the predetermined level. The predetermined level may be calibratable and may be set to, for example, approximately 2.0 gallons.

The enabling/disabling module 204 also disables the diagnostic module 150 when the system voltage is outside of the predetermined voltage range. The system voltage may include a voltage of an energy storage device of the vehicle (e.g., a battery), a voltage input to the ECM 130, or another suitable voltage. The predetermined voltage range may be calibratable and may be bounded by voltages of, for example, approximately 9.0 V and 16.0 V. The enabling/disabling module 204 also disables the diagnostic module 150 when a fault has been diagnosed in the low pressure pump 120 and/or low side rail pressure sensor 131.

The monitoring module 205 receives the high side rail pressure from the high side rail pressure sensor 132. The monitoring module 205 monitors the high side rail pressure and provides the high side rail pressure to the diagnostic module 150. The monitoring module 205 may indicate when the high side rail pressure is out of range. The monitoring module 205 may also filter, buffer, and/or digitize the high side rail pressure.

The diagnostic module 150 selectively diagnoses a fault in the high pressure pump 122 and/or the high side rail pressure sensor 132. The diagnostic module 150 selectively diagnoses the fault based on a comparison of the first predetermined pressure and the high side rail pressure measured during engine cranking.

The first predetermined pressure is determined based on engine coolant temperature and ethanol percentage of the fuel. In one implementation, the first predetermined pressure may increase as the coolant temperature decreases and/or as the ethanol percentage of the fuel increases.

The diagnostic module 150 determines whether the high side rail pressure is greater than the first predetermined pressure. The diagnostic module 150 starts a timer when the high side rail pressure is less than or equal to the first predetermined pressure. The timer may be implemented in, for example, the timer module 206. The timer may be reset to a predetermined reset value (e.g., zero) before the timer is started. In this manner, the timer tracks the period elapsed after the initial high side rail pressure is determined to be less than the first predetermined pressure.

The diagnostic module 150 monitors the timer and diagnoses the fault based on whether the high side rail pressure exceeds the first predetermined pressure within a predetermined period. The diagnostic module 150 diagnoses the fault when the high side rail pressure remains less than the first predetermined pressure for the predetermined period. Conversely, no fault is diagnosed when the high side rail pressure exceeds the first predetermined pressure within the predetermined period. The predetermined period may be calibratable and may be set to, for example, approximately 5.0 seconds.

The diagnostic module 150 commands initiation of fuel injection and increments a counter of the counter module 208 when the initial high side rail pressure is greater than the first predetermined pressure. The diagnostic module 150 also selectively diagnoses the fault based on a comparison of the high side rail pressure and a second predetermined pressure. For example only, the second predetermined pressure may be determined based on the engine coolant temperature and ethanol percentage of the fuel. In one implementation, the first predetermined pressure may increase as the coolant temperature decreases and/or as the ethanol percentage of the fuel increases. The second predetermined pressure may be less than the first predetermined pressure.

The counter module 208 may include an X-Y counter. When the initial high side rail pressure is greater than the first predetermined pressure, the diagnostic module 150 increments the X counter value for each sample of the high side rail pressure that is less than the second predetermined pressure. The diagnostic module 150 also increments the Y counter value for each sample received. In this manner, the X counter tracks the number of samples that fall below the second predetermined pressure and the Y counter value tracks the total number of samples received. The counter values may be reset to a predetermined reset value (e.g., zero) before being incremented.

The diagnostic module 150 selectively diagnoses the fault based on the X and Y counter values. More specifically, the diagnostic module 150 diagnoses the fault when the X counter value is greater than a predetermined fault value. In some implementations, the diagnostic module 150 may diagnose the fault before the Y counter value reaches the predetermined total value. In other implementations, the diagnostic module 150 may wait to diagnose the fault until the Y counter value reaches the predetermined total value. The predetermined fault value is generally less than the predetermined total value (i.e., $X \leqq Y$).

The diagnostic module 150 sets the fault indicator (e.g., a diagnostic trouble code) in the diagnostic memory 138 when the fault is diagnosed. The fault indicator that is set when the fault is diagnosed is indicative of a fault in the high pressure pump 122 and/or the high side rail pressure sensor 132. One fault indicator may be specified for each of the high pressure pump 122 and the high side rail pressure sensor 132. The fault control module 210 accesses the diagnostic memory 138 and illuminates an indicator, such as the MIL 140, when the fault indicator is set in the diagnostic memory 138.

The fault control module 210 may also perform other remedial actions when the fault is diagnosed in the high pressure pump 122 and/or the high side rail pressure sensor 132. For example only, the fault control module 210 may extend the period allotted for engine cranking.

Figure 3A:
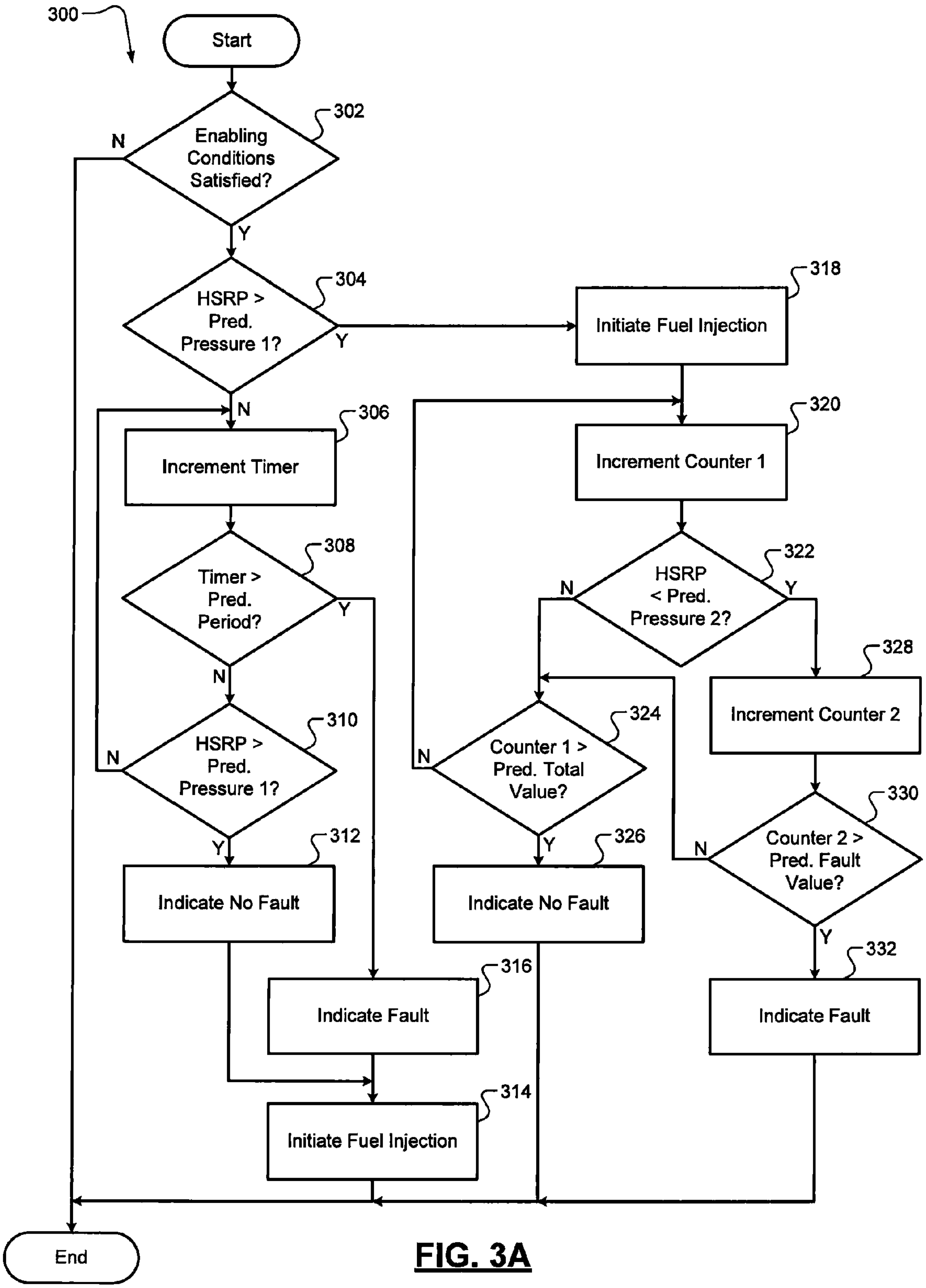
FIGS. 3A-3C are flowcharts depicting exemplary steps performed by diagnostic systems according to the principles of the present disclosure.

Referring now to FIG. 3A, an exemplary method 300 performed by the diagnostic system 200 is presented. The method 300 begins in step 302 where the method 300 determines whether the enabling conditions are satisfied. If true, the method 300 continues to step 304; if false, the method 300 ends. For example only, the enabling conditions may be deemed satisfied when: (1) the engine speed is greater than the predetermined speed; (2) the fuel level is greater than the predetermined level; (3) the system voltage is within the predetermined voltage range; and (4) no fault has been diagnosed in either the low pressure pump 120 or the low side rail pressure sensor 131.

Figure 3B:
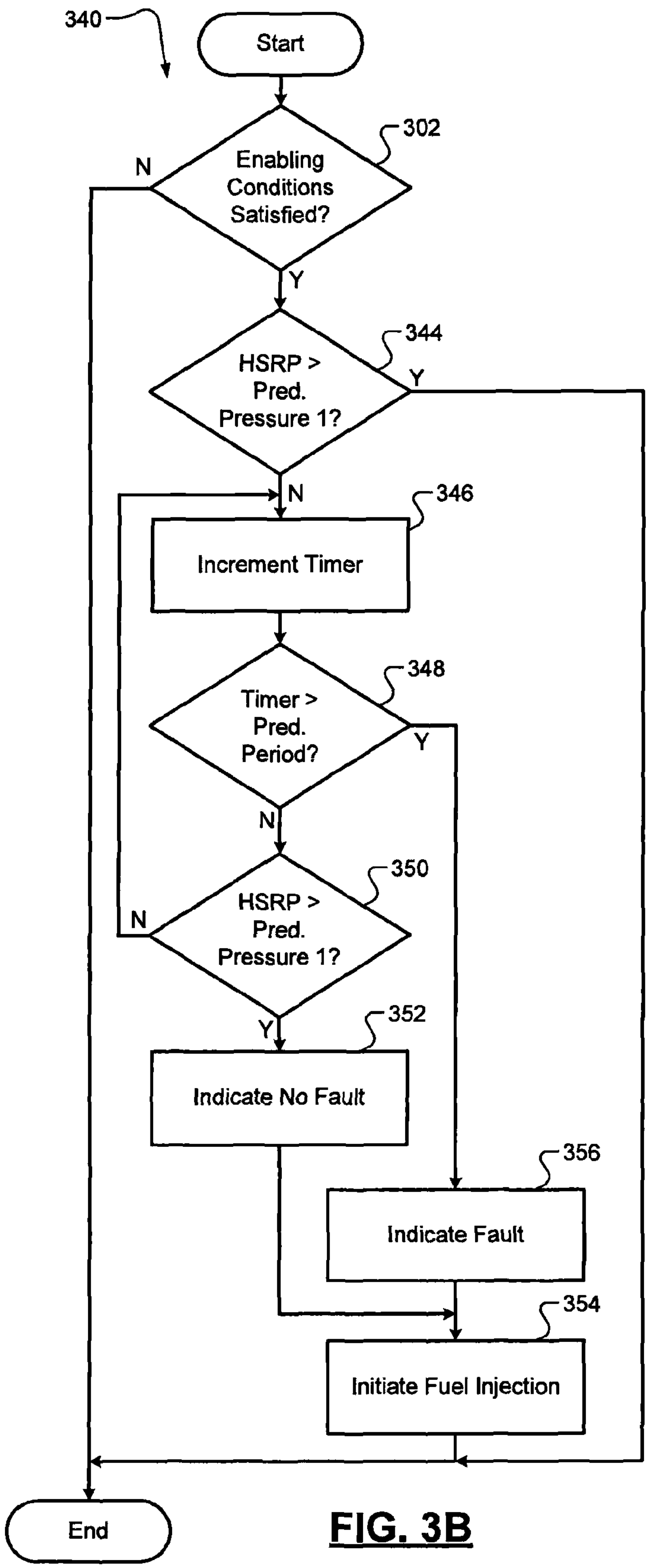
Figure 3C:
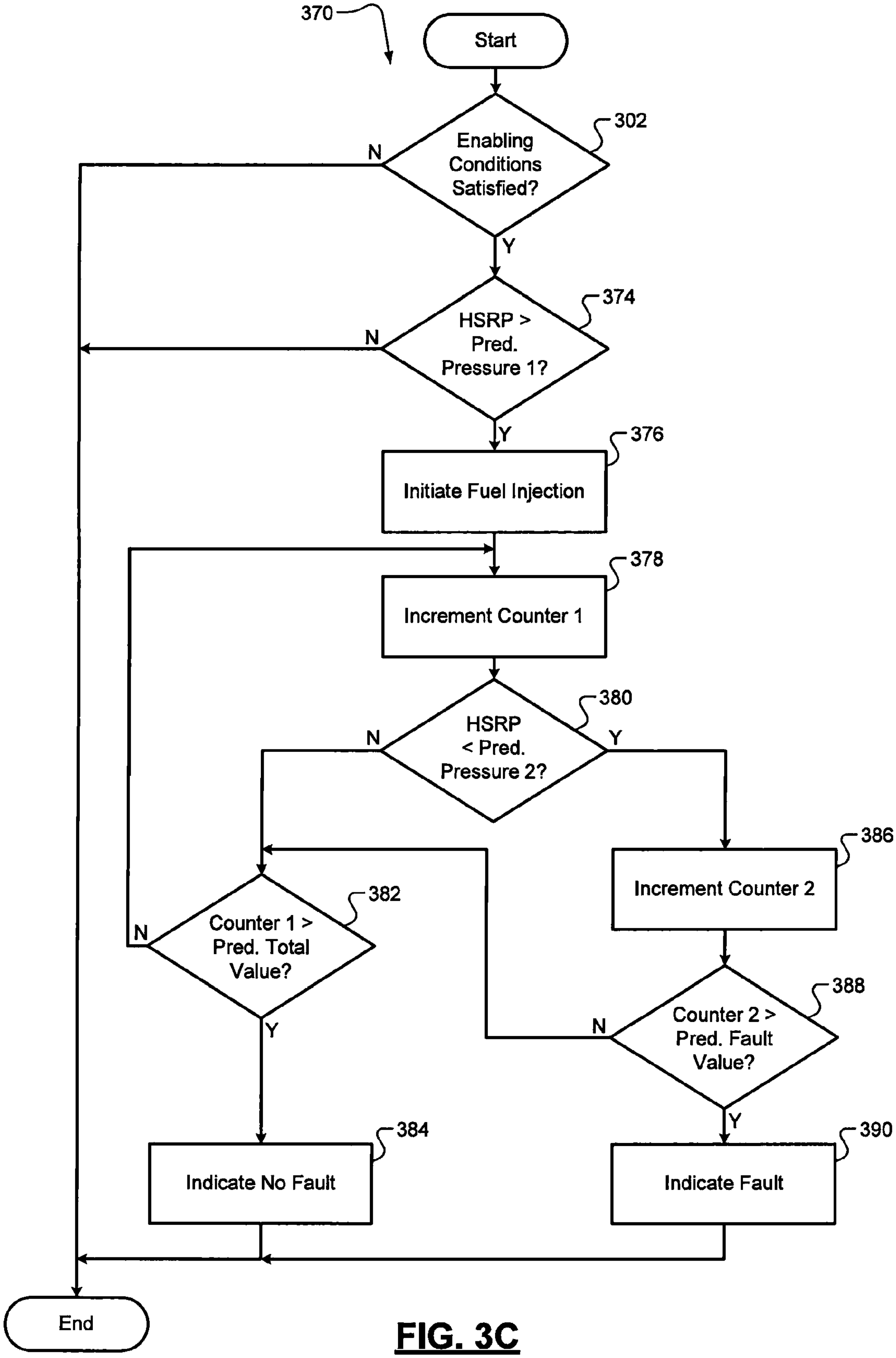

In step 304, the method 300 determines whether the high side rail pressure (HSRP in FIGS. 3A-3C) is greater than the first predetermined pressure (i.e., pred. pressure 1 in FIGS. 3A-3C). If true, the method 300 transfers to step 318; if false, the method 300 continues to step 306. The first predetermined pressure is determined based on the engine coolant temperature and the ethanol percentage of the fuel. Step 318 is discussed in detail below.

The method 300 increments the timer in step 306. In this manner, the timer tracks the period elapsed after the high side rail pressure was determined to be less than the first predetermined pressure. The method 300 determines whether the timer is greater than the predetermined period in step 308. If true, the method 300 transfers to step 316; if false, the method 300 continues to step 310. Step 316 is discussed in detail below.

In step 310, the method 300 determines whether the high side rail pressure is greater than the first predetermined pressure. If true, the method 300 continues to step 312; if false, the method 300 returns to step 306. The method 300 indicates that no fault is present in the high pressure pump 122 or the high side pressure sensor 132 in step 312. In this manner, no fault is diagnosed when the high side rail pressure exceeds the first predetermined pressure within the predetermined period. The method 300 initiates fuel injection in step 314, and the method 300 ends.

Referring back to step 316 (i.e., when the timer is greater than the predetermined period), the method 300 indicates that a fault is present in the high pressure pump 122 and/or the high side pressure sensor 132. In this manner, the method 300 diagnoses the fault when the high side rail pressure remains below the first predetermined pressure for the predetermined period. The method 300 may perform remedial action, such as setting a fault indicator, illuminating the MIL 140, and/or extending the time for engine cranking after diagnosing the fault. The method 300 transfers to step 314 where the method 300 initiates fuel injection and the method 300 ends.

Referring back to step 318 (i.e., when the high side rail pressure is initially greater than the first predetermined pressure), the method 300 initiates fuel injection. The method 300 increments a first counter (e.g., the Y counter above) in step 320. The method 300 determines whether the high side rail pressure is less than the second predetermined pressure (i.e., pred. pressure 2 in FIGS. 3A-3C) in step 322. If true, the method 300 transfers to step 328; if false, the method 300 continues in step 324. For example only, the second predetermined pressure is determined based on the engine coolant temperature and the ethanol percentage of the fuel. Step 328 is discussed in detail below.

In step 324, the method 300 determines whether the first counter is greater than the predetermined total value. If true, the method 300 indicates that no fault is present in step 326 and the method 300 ends. If false, the method 300 returns to step 320.

The method 300 increments a second counter (e.g., the X counter above) in step 328. The method 300 determines whether the second counter is greater than the predetermined fault value in step 330. If false, the method 300 transfers to step 324. If true, the method 300 indicates that a fault has occurred in the high pressure pump 122 and/or the high side pressure sensor 132 and the method 300 ends.

In this manner, the method 300 diagnoses the fault when a predetermined number of samples received are less than the second predetermined pressure. The method 300 may also perform remedial action, such as setting a fault indicator, illuminating the MIL 140, and/or extending the time for engine cranking after diagnosing the fault.

Referring now to FIG. 3B, a flowchart depicting another exemplary method 340 performed by the diagnostic system 200 is presented. The method 340 begins in step 302 where the method 340 determines whether the enabling conditions are satisfied. If true, the method 340 continues to step 344; if false, the method 340 ends. The enabling conditions are discussed above.

Steps 344-356 may be performed similarly or identically to steps 304-316 of FIG. 3A. In step 344, the method 340 determines whether the high side rail pressure is greater than the first predetermined pressure. If true, the method 340 ends; if false, the method 340 continues to step 346. The first predetermined pressure is set based on the engine coolant temperature and the ethanol percentage of the fuel.

The method 340 increments the timer in step 346. In this manner, the timer tracks the period elapsed after the determination that the high side rail pressure was less than the first predetermined pressure. The method 340 determines whether the timer is greater than the predetermined period in step 348. If true, the method 340 transfers to step 356; if false, the method 340 continues to step 350. Step 356 is discussed in detail below.

In step 350, the method 340 determines whether the high side rail pressure is greater than the first predetermined pressure. If true, the method 340 continues to step 352; if false, the method 340 returns to step 346. The method 340 indicates that no fault is present in the high pressure pump 122 or the high side rail pressure sensor 132 in step 352. In this manner, no fault is diagnosed when the high side rail pressure exceeds the first predetermined pressure within the predetermined period. The method 340 initiates fuel injection in step 354, and the method 340 ends.

Referring back to step 356 (i.e., when the timer is greater than the predetermined period), the method 340 indicates that a fault has occurred in the high pressure pump 122 and/or the high side pressure sensor 132. In this manner, the method 340 diagnoses the fault when the high side rail pressure remains below the first predetermined pressure for the predetermined period. The method 340 may perform remedial action, such as setting a fault indicator, illuminating the MIL 140, and/or extending the time for engine cranking after diagnosing the fault. The method 340 transfers to step 354 where the method 340 initiates fuel injection and the method 340 ends.

Referring now to FIG. 3C, a flowchart depicting another exemplary method 370 performed by the diagnostic system 200 is presented. The method 370 begins in step 302 where the method 370 determines whether the enabling conditions are satisfied. If true, the method 370 continues to step 374; if false, the method 370 ends. The enabling conditions are discussed above.

Steps 374-356 may be performed similarly or identically to steps 304 and 318-332 of FIG. 3A. In step 374, the method 370 determines whether the high side rail pressure is greater than the first predetermined pressure. If true, the method 370 continues to step 376; if false, the method 370 ends. The first predetermined pressure is determined based on the engine coolant temperature and the ethanol percentage of the fuel.

The method 370 initiates fuel injection in step 376. The method 370 increments the first counter (e.g., the Y counter above) in step 378. The method 370 determines whether the high side rail pressure is less than the second predetermined pressure in step 380. If true, the method 370 transfers to step 386; if false, the method 370 continues in step 382. For example only, the second predetermined pressure is determined based on the engine coolant temperature and the ethanol percentage of the fuel. Step 386 is discussed in detail below.

In step 382, the method 370 determines whether the first counter is greater than the predetermined total value. If true, the method 370 indicates that no fault is present in step 384 and the method 370 ends. If false, the method 370 returns to step 378.

The method 370 increments a second counter (e.g., the X counter above) in step 386. The method 370 determines whether the second counter is greater than the predetermined fault value in step 388. If false, the method 370 transfers to step 382. If true, the method 370 indicates that a fault has occurred in the high pressure pump 122 and/or the high side pressure sensor 132 in step 390 and the method 370 ends. In this manner, the method 370 diagnoses the fault when a predetermined number of samples received are less than the second predetermined pressure. The method 370 may also perform remedial action, such as setting a fault indicator, illuminating the MIL 140, and/or extending the time for engine cranking after diagnosing the fault.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system comprising:

a monitoring module that receives a first rail pressure measured by a high side rail pressure sensor during engine cranking at a location where fuel is pressurized by a high pressure fuel pump, wherein the high pressure fuel pump is driven by a crankshaft; and a diagnostic module that selectively diagnoses a fault in at least one of said high pressure fuel pump and said high side rail pressure sensor when said first rail pressure is less than a predetermined pressure and rail pressures received during a predetermined period after said first rail pressure is received are less than said predetermined pressure.

2. The diagnostic system of claim 1 wherein said diagnostic module diagnoses said fault when each of said rail pressures received during said predetermined period are less than said predetermined pressure.

3. The diagnostic system of claim 1 wherein said diagnostic module diagnoses said fault when said first rail pressure is greater than said predetermined pressure and a second rail pressure is less than a second predetermined pressure, and wherein said second rail pressure is received after said first rail pressure and said second predetermined pressure that is less than said predetermined pressure.

4. The diagnostic system of claim 1 wherein said diagnostic module diagnoses said fault when said first rail pressure is greater than said predetermined pressure and a predetermined number of rail pressures received after said first rail pressure are less than a second predetermined pressure, and wherein said second predetermined pressure is less than said predetermined pressure.

5. The diagnostic system of claim 1 further comprising a disabling module that disables said diagnostic module when an engine speed is less than a predetermined speed.

6. The diagnostic system of claim 1 further comprising a disabling module that disables said diagnostic module when a fuel level is less than a predetermined level.

7. The diagnostic system of claim 1 further comprising a disabling module that disables said diagnostic module when a fault has been diagnosed in at least one of a low pressure fuel pump and a low side rail pressure sensor that measures fuel pressure between said high and low pressure fuel pumps.

8. The diagnostic system of claim 1 further comprising a fault control module that extends a period for said engine cranking when said fault is diagnosed.

9. A diagnostic system comprising:

a monitoring module that receives first and second rail pressures measured by a high side rail pressure sensor during engine cranking at a location where fuel is pressurized by a high pressure fuel pump, wherein said second rail pressure is received after said first rail pressure; and a diagnostic module that selectively diagnoses a fault in at least one of said high pressure fuel pump and said high side rail pressure sensor when said first rail pressure is greater than a first predetermined pressure and said second rail pressure is less than a second predetermined pressure, wherein said second predetermined pressure is less than said first predetermined pressure.

10. The diagnostic system of claim 9 wherein said diagnostic module diagnoses said fault when a predetermined number of rail pressures received after said first rail pressure are less than said second predetermined rail pressure.

11. The diagnostic system of claim 9 wherein said diagnostic module diagnoses said fault when said first rail pressure is less than said first predetermined pressure and each rail pressure received during a predetermined period after said first rail pressure is received is less than said first predetermined pressure.

12. The diagnostic system of claim 9 further comprising a disabling module that disables said diagnostic module when an engine speed is less than a predetermined speed.

13. The diagnostic system of claim 9 further comprising a disabling module that disables said diagnostic module when a fuel level is less than a predetermined level.

14. The diagnostic system of claim 9 further comprising a disabling module that disables said diagnostic module when a fault has been diagnosed in at least one of a low pressure fuel pump and a low side rail pressure sensor that measures fuel pressure between said high and low pressure fuel pumps.

15. The diagnostic system of claim 9 further comprising a fault control module that extends a period for said engine cranking when said fault is diagnosed.

16. A diagnostic method comprising:

receiving a first rail pressure measured by a high side rail pressure sensor during engine cranking at a location where fuel is pressurized by a high pressure fuel pump, wherein the high pressure fuel pump is driven by a crankshaft; and selectively diagnosing a fault in at least one of said high pressure fuel pump and said high side rail pressure sensor when said first rail pressure is less than a predetermined pressure and rail pressures received during a predetermined period after said first rail pressure is received are less than said predetermined pressure.

17. The diagnostic method of claim 16 further comprising diagnosing said fault when each of said rail pressures received during said predetermined period are less than said predetermined pressure.

18. The diagnostic method of claim 16 further comprising diagnosing said fault when said first rail pressure is greater than said predetermined pressure and a second rail pressure is less than a second predetermined pressure, and wherein said second rail pressure is received after said first rail pressure and said second predetermined pressure is less than said predetermined pressure.

19. The diagnostic method of claim 16 further comprising diagnosing said fault when said first rail pressure is greater than said predetermined pressure and a predetermined number of rail pressures received after said first rail pressure are less than a second predetermined pressure, and wherein said second predetermined pressure is less than said predetermined pressure.

20. The diagnostic method of claim 16 further comprising disabling said selectively diagnosing when an engine speed is less than a predetermined speed.

21. The diagnostic method of claim 16 further comprising disabling said selectively diagnosing when a fuel level is less than a predetermined level.

22. The diagnostic method of claim 16 further comprising disabling said selectively diagnosing when a fault has been diagnosed in at least one of a low pressure fuel pump and a low side rail pressure sensor that measures fuel pressure between said high and low pressure fuel pumps.

23. The diagnostic method of claim 16 further comprising extending a period for said engine cranking when said fault is diagnosed.

24. A diagnostic method comprising:

receiving a first and second rail pressures measured by a high side rail pressure sensor during engine cranking at a location where fuel is pressurized by a high pressure fuel pump, wherein said second rail pressure is received after said first rail pressure; and selectively diagnosing a fault in at least one of said high pressure fuel pump and said high side rail pressure sensor when said first rail pressure is greater than a first predetermined pressure and said second rail pressure is less than a second predetermined pressure, wherein said second predetermined pressure is less than said first predetermined pressure.

25. The diagnostic method of claim 24 further comprising diagnosing said fault when a predetermined number of rail pressures received after said first rail pressure are less than said second predetermined rail pressure.

26. The diagnostic method of claim 24 further comprising diagnosing said fault when said first rail pressure is less than said first predetermined pressure and each rail pressure received during a predetermined period after said first rail pressure is received is less than said first predetermined pressure.

27. The diagnostic method of claim 24 further comprising disabling said selectively diagnosing when an engine speed is less than a predetermined speed.

28. The diagnostic method of claim 24 further comprising disabling said selectively diagnosing when a fuel level is less than a predetermined level.

29. The diagnostic method of claim 24 further comprising disabling said selectively diagnosing when a fault has been diagnosed in at least one of a low pressure fuel pump and a low side rail pressure sensor that measures fuel pressure between said high and low pressure fuel pumps.

30. The diagnostic method of claim 24 further comprising extending a period for said engine cranking when said fault is diagnosed.

* * * * *